(12) United States Patent
Nielsen

(10) Patent No.: US 9,328,718 B2
(45) Date of Patent: May 3, 2016

(54) METHOD OF CALCULATING AN ELECTRICAL OUTPUT OF A WIND POWER PLANT

(75) Inventor: Peter Nielsen, Middelfart (DK)

(73) Assignee: Vestas Wind Systems A/S, Aarhus N. (DK)

( * ) Notice: Subject to any disclaimer, the term of this patent is extended or adjusted under 35 U.S.C. 154(b) by 1123 days.

(21) Appl. No.: 13/379,473

(22) PCT Filed: Jun. 29, 2010

(86) PCT No.: PCT/EP2010/059199
§ 371 (c)(1),
(2), (4) Date: Feb. 13, 2012

(87) PCT Pub. No.: WO2011/000825
PCT Pub. Date: Jan. 6, 2011

(65) Prior Publication Data
US 2012/0143537 A1 Jun. 7, 2012

Related U.S. Application Data

(60) Provisional application No. 61/223,716, filed on Jul. 8, 2009.

(30) Foreign Application Priority Data

Jun. 30, 2009 (DK) ................................. 2009 00810

(51) Int. Cl.
*G06F 17/18* (2006.01)
*F03D 7/04* (2006.01)

(52) U.S. Cl.
CPC .............. *F03D 7/048* (2013.01); *F05B 2260/80* (2013.01); *F05B 2260/821* (2013.01);

(Continued)

(58) Field of Classification Search
USPC .................................................. 702/60, 179
See application file for complete search history.

(56) References Cited

U.S. PATENT DOCUMENTS 6,975,925 B1  12/2005  Barnes et al.
7,392,114 B2 * 6/2008  Wobben ................ F03D 7/0272
                                                      290/44

(Continued)

FOREIGN PATENT DOCUMENTS

WO      2009024833 A1    2/2009

OTHER PUBLICATIONS

Danish Patent and Trademark Office, Search Report and Written Opinion received in related application No. PA 2009 00810 dated Feb. 11, 2010.

(Continued)

*Primary Examiner* — Mohamed Charioui
(74) *Attorney, Agent, or Firm* — Patterson & Sheridan, LLP

(57) ABSTRACT

The invention relates to a method of calculating an electrical output of a wind power plant comprising a plurality of wind turbines. Instead of calculating the electrical output of the wind power plant as a simple aggregation of the outputs of each wind turbine, the method takes into account parameters which may vary stochastically throughout the wind power plant, e.g. pitch angle, stiffness in drive train, different possible production with regard to reactive and active effect, mechanical component properties as well as variability in relation to communication times between a power plant controller and the individual wind turbines. The method proposes to make adjustment to a simple aggregation calculation method based on analysis of such stochastic varying parameters.

20 Claims, 12 Drawing Sheets

(52) U.S. Cl.
CPC .... *F05B 2260/84* (2013.01); *F05B 2270/1033* (2013.01); *F05B 2270/32* (2013.01); *F05B 2270/321* (2013.01); *F05B 2270/335* (2013.01); *Y02E 10/723* (2013.01); *Y02P 70/523* (2015.11)

(56) References Cited

U.S. PATENT DOCUMENTS

2002/0194113 A1* 12/2002 Lof et al. .................. 705/37
2007/0267873 A1* 11/2007 Teichmann ................ 290/44

OTHER PUBLICATIONS

Qiao, et al. "Dynamic Modeling of Wind Farms with Fixed-Speed Wind Turbine Generators", Power Engineering Society General Meeting, 2007.

Fernandez et al., "Dynamic models of wind farms with fixed speed wind turbines", Renewable Energy, Pergman Press, Oxford, GB vol. 31 No. 8 Jul. 1, 2006.

Slootweg, "Modeling of Large Wind Farms in Power System Simulations", 2002 IEEE Power Engineering Society, conference proceedings, Jul. 21-25 2002, Chicago, IL.

European Patent Office, Search Report and Written Opinion issued in related International application No. PCT/EP2010/059199 dated Nov. 21, 2011.

Norgaard, et al., "A Multi-Turbine Power Curve Approach", Nordic Wind Power Conference, Mar. 1-2, 2004, Chalmers University of Technology.

Di Fazio et al., "On the Relevance of Reliability Assessment for Wind Farm Performance Evaluation", Conference Proceedings Article: Universities Power Engineering. Conference, 2008.

* cited by examiner

METHOD OF CALCULATING AN ELECTRICAL OUTPUT OF A WIND POWER PLANT

FIELD OF THE INVENTION

The present invention relates to a method of calculating an electrical output of a wind power plant.

BACKGROUND OF THE INVENTION

Wind turbines are arranged to convert energy contained in flowing wind to electrical energy. Because of technological constraints, the size of individual wind turbines is still limited to a few or several megawatts. Therefore, wind turbines may be brought together in wind power plants, also referred to as wind farms or wind parks. A wind power plant typically consists of tens to hundreds of wind turbines arranged to run simultaneously. The wind turbines are electrically connected in a collector grid (typically underground cables). The wind turbines and the collector system is connected to the transmission or distribution grid at a single point, referred to as the point of common connection (PCC) of the particular wind power plant. With the increase in penetration of wind power in power systems, the dynamic influence of a large wind power plant on power systems is becoming an issue for integration and operation of wind power plants. Therefore it is important to be able to calculate the electrical output from wind power plants.

The dynamic behavior of a wind power plant may be represented by a detailed model in which the dynamics of each individual wind turbine and the internal electrical network are fully represented. However, since a large wind power plant typically comprises a large number of wind turbines, such a detailed model requires excessive computational time in order to determine the electrical output from the wind power plant. It is thus a problem of such a detailed model, that it is not suitable for studying the impact of the entire wind power plant on the dynamic behavior of a large-scale power system. To reduce the simulation time or calculation time, the complexity of the wind power plant model may be reduced by equivalent models, wherein all the wind turbines in the wind power plant are aggregated into a single equivalent wind turbine operating on an equivalent internal electrical network. However, the electrical output obtained from such an equivalent wind turbine will typically not provide a precise calculation of the electrical output of a wind power plant.

Hence, an improved method of calculating an electrical output of a wind power plant comprising a first number of wind turbines would be advantageous.

SUMMARY OF THE INVENTION

Accordingly, the invention preferably seeks to mitigate, alleviate or eliminate one or more of the above mentioned disadvantages singly or in any combination. In particular, it may be seen as an object of the present invention to provide a method of calculating an electrical output of a wind power plant comprising a first number (N) of wind turbines, where the method solves the above mentioned problems of the prior art with regards to precision of the calculation of the electrical output from an aggregated model relating to an single equivalent wind turbine.

This object and several other objects are obtained in a first aspect of the invention by providing a method of calculating an electrical output of a wind power plant comprising a first number (N) of wind turbines, said method comprising the steps of:

(a) obtaining electrical output data from at least one of said wind turbines;

(b) calculating said electrical output of the wind power plant from the obtained electrical output data from the at least one of said wind turbines and from the number (N) of wind turbines; wherein step (b) comprises:

(b1) performing a statistical assessment of stochastic variability of one or more input parameters between the individual wind turbines of said first number (N) of wind turbines, wherein said one or more input parameters varying stochastically are chosen from the list of: electrical parameters, mechanical parameters, operation conditions of individual wind turbines in wind power plant, and communication times between a power plant controller and individual wind turbines;

(b2) calculating the influence of the stochastic variability of said one or more input parameters on the electrical output of the wind power plant, and (b3) providing the calculation as an aggregation of the individual wind turbines adjusted by said calculated influence of the stochastically variability of said one or more input parameters.

The method of the invention is particularly, but not exclusively, advantageous for obtaining a precise calculation of the electrical output of a wind power plant, while still obtaining the advantages of the simplicity of an equivalent model calculation representing one or a few wind turbines. A simple aggregation of individual wind turbines corresponds to multiplying the number of wind turbines (N) with the output of a single wind turbine. The method of the invention proposes an adjusted aggregation, wherein the simple aggregation is adjusted by the influence of stochastic varying parameters. The enhanced precision of the aggregated calculation is thus obtained by taking due account of the variability between individual wind turbines in a wind turbine park as well as their operating conditions. Thus, while a simple aggregated model calculation obtained by aggregating the number of wind turbines into a single equivalent model, whereby e.g. the nominal power of a wind power park is equated with the sum of nominal power of the individual wind turbines, does not take the influence of stochastic variability of relevant input parameters into account and will thus not be able to provide the most precise calculation results, the method of the invention may use statistical analysis of stochastically variable input parameters in order to adjust such an aggregation of individual wind turbines.

Even if the wind turbines in the number (N) of wind turbines are equivalent, i.e. the same model arranged to produce equivalent output, differences in the characteristics of the individual wind turbines exist, such as differences in the mechanical or electrical properties. Such small differences between the individual mechanical or electrical properties of the wind turbines may result in an empirical spread in the output. Thus, an aggregation taking this spread of the intrinsic properties of the wind turbines into consideration provides a more precise result than a simple aggregation of the output of a single wind turbine. Moreover, communication times between the power plant controller and the individual wind turbines of the wind power plant may differ enough to influence the calculation of the total output of the wind power plant. Thus, taking the stochastic variability of these communication times into account also enhances the precision of the calculation of the electrical output of the wind power plant.

The electrical input parameters may include torsion damping controller parameters for controlling the generator of a wind turbine in order to let the generator damp mechanical oscillations of the drive train of the wind turbine. Even though drive train damping controller parameters may be identical between turbines, the variability of the mechanical parameters typically leads to a diversity of the controller response. The mechanical parameters may include pitch angle of blades of the wind turbine and/or the drive train parameters, such as the eigen-frequency of the drive train of a wind turbine.

The one or more input parameters varying stochastically may further comprise the wind speed and/or the wind direction. If the wind turbines are spread over a relatively large area, the wind speed and/or the wind direction at the individual wind turbines may vary. By taking the stochastic nature of the wind speed and wind direction at the individual wind turbines of a wind power park into account, a more accurate calculation of the active capability and the reactive capability of the wind power park may be achieved.

The calculation method may represent an equivalent of a single wind turbine or an equivalent of a second number of wind turbines, where the second number is substantially smaller than the first number.

The electrical output may be one or more of the following: a power curve of the wind power plant, the active capability of a wind power plant, and the reactive capability of a wind power plant.

In one example, the one or more input parameters comprise the wind speed, and the electrical output of the wind power plant comprises the active and reactive production capabilities. Thus, step (b1) comprises performing a statistical assessment of stochastic variability of the wind speed, and step (b2) comprises calculating the influence of the stochastic variability of said one or more input parameters on the active and reactive production capabilities of the wind power plant, and (b3) providing the calculation as an aggregation of the individual wind turbines corrected by said calculated influence of the stochastically variability of the wind speed.

In another example, the one or more input parameters comprise eigen-frequencies of drive-trains of individual wind turbines within the wind power park. The eigen-frequencies of the drive-trains of the individual wind turbine are typically not exactly the same due to differing operating and other conditions, such as different pitching of the blades, temperature-dependencies and wear of components, between of the individual wind turbines of a wind power park. Moreover, the mechanical component properties typically differ somewhat between individual wind turbines, even of the same model and type, resulting in differing eigen-frequencies. Taking these differences in eigen-frequencies into account provides for a more precise calculation of electrical output from the wind power plant. Moreover, the one or more input parameters may comprise torsion damping controller parameters relating to the generator component of the individual wind turbines. Typically, mechanical oscillations are alleviated by controlling the generator by means of torsion damping controller parameters so as to counteract or neutralize the mechanical oscillations. Taking variations in such torsion damping controller parameters between the individual wind turbines of a wind power plant into account, renders a more precise calculation of the output of the wind power plant. Again, controller parameters are usually identical for all wind turbines within a wind power plant. One example of an embodiment of the method of calculating the electrical output of a wind power plant suggests a variation of the torsion damping controller parameters of the single aggregated turbine calculation over time in order to emulate the cancellation effects caused by the diversity of mechanical parameters of the turbines.

In yet another example, the one or more input parameters comprise the time delay for communication between a wind power plant controller and the individual wind turbines. The communication between the plant controller of a wind power plant and the individual wind turbines of the wind power plant may e.g. be in the form of daisy-chaining, where the communication between individual wind turbines is performed by sending data along from one wind turbine to another in sequence until it has reached all relevant wind turbines. Hereby, the communication time or communication delay from a power plant controller to the individual wind turbines will vary, and e.g. set-points from the plant controller sent to the individual wind turbines are not received simultaneous by all wind turbines.

Moreover, the communication delays between wind turbines and power plant controller vary due to other communication traffic; this variation is also stochastic.

In another aspect, the invention relates to a computer program product being adapted to enable a computer system comprising at least one computer having data storage means associated therewith to perform the method according to the first aspect of the invention.

This aspect of the invention is particularly, but not exclusively, advantageous in that the present invention may be implemented by a computer program product enabling a computer system to perform the operations of the second aspect of the invention. Thus, it is contemplated that some known apparatus may be changed to operate according to the present invention by installing a computer program product on a computer system controlling the said optical recording apparatus. Such a computer program product may be provided on any kind of computer readable medium, e.g. magnetically or optically based medium, or through a computer based network, e.g. the Internet.

The above aspects and other aspects of the invention will be apparent from and elucidated with reference to the embodiments described hereinafter.

The term "wind turbine" (WT) is meant to denote an entity arranged for converting the wind's power into electrical power. A wind turbine is connected to some electrical network, and comprises a rotor one or more blades, a hub, a nacelle typically comprising a generator and a drive train as well as control systems, a tower and a foundation. The wind turbine may also comprise a yaw system as well as measuring units for measuring wind speed, vibrations, output power, etc.

The term "wind power plant" (WPP) is meant to be synonymous to "wind farm" and "wind park;" the term covers elements needed for a wind power plant WPP to produce energy. Such elements could e.g. be a number of wind turbines WT, substation (SUB), control units located internally or externally to the wind power plant WPP.

The term "power plant controller" is meant to denote a controller of the wind power plant arranged to communicate with turbine control processors of individual wind turbines of the wind power plant.

The term "generator" is meant to denote an electrical generator arranged for converting mechanical energy to electrical energy using electromagnetic induction. The generator may e.g. be a doubly fed induction generator (DFIG), an asynchronous generator (AG) without converters or without a full-scale converter, or a synchronous generator (SG) with full scale converters.

The term "drive train" denotes the group of components of a wind turbine that is rotating. In particular, the drive train comprises the rotor with a hub and blades, and the shaft(s) from the rotor to the generator. Typically, the drive train may be seen as a slowly rotating mass connected by a gear to a quickly rotating mass. Moreover, the drive train may include support bearings, one or more couplings, a brake and the rotating parts of the generator.

BRIEF DESCRIPTION OF THE FIGURES

The present invention will now be explained, by way of example only, with reference to the accompanying Figures, where.

DETAILED DESCRIPTION OF AN EMBODIMENT

Figure 1:
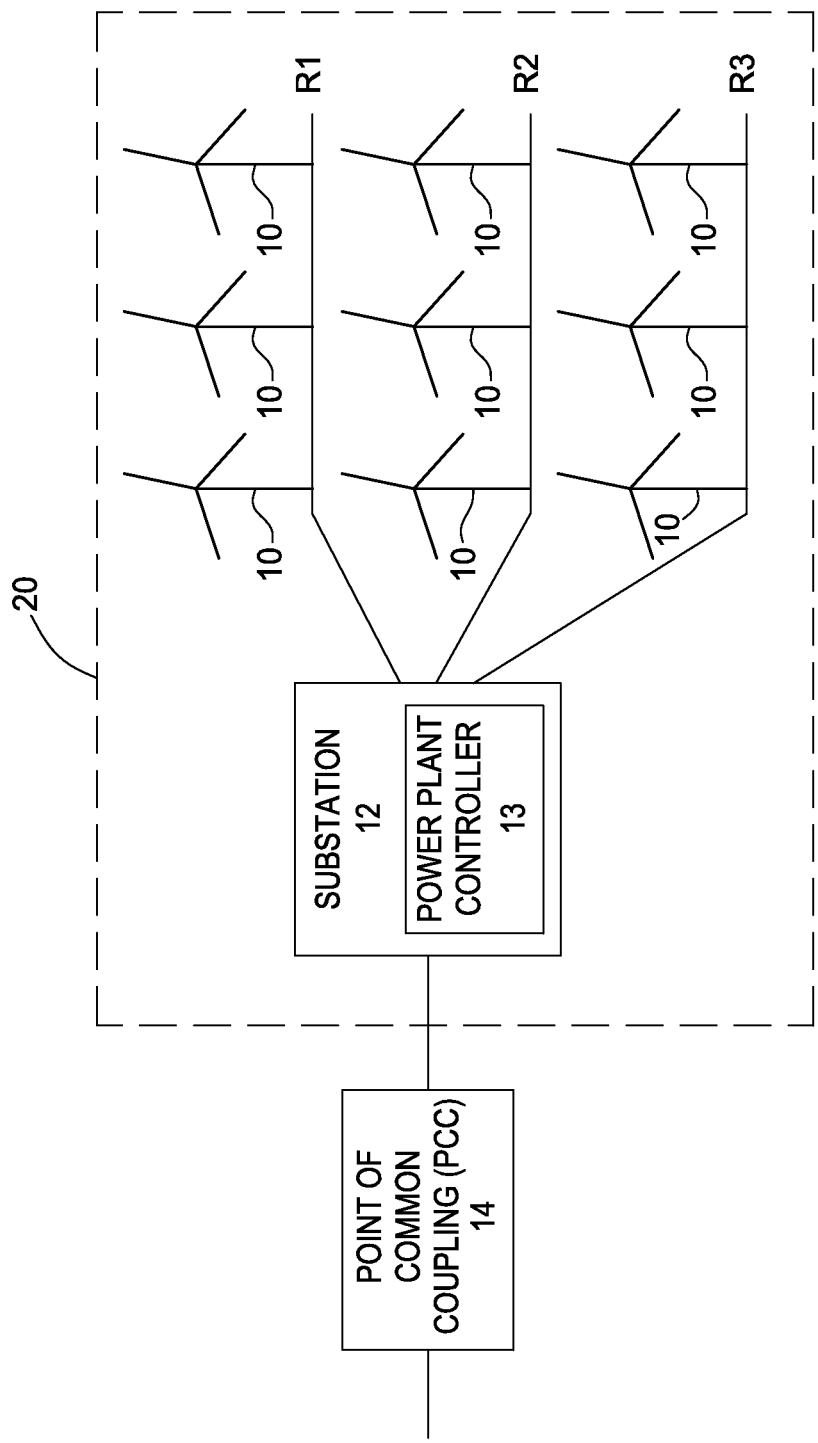
FIG. 1 is a schematic drawing of a wind power plant.

FIG. 1 is a schematic drawing of a wind power plant 20 comprising three radials R1, R2, R3. In FIG. 1, three wind turbines 10 are on each of the three radials R1, R2, R3. It should be understood, that the number of radials and wind turbines 10 in FIG. 1 is limited for the sake of clarity and that a wind power plant 20 could comprise any appropriate number of radials each having any appropriate number of wind turbines 10. Each radial R1, R2, R3 is connected to a substation 12 in order to deliver electrical output from the wind turbines 10 to the substation and further on to a point of common coupling 14 to an electrical grid (not shown). The substation may comprise any relevant components (not shown in FIG. 1) in order to monitor and control the wind turbines 10 of the wind power plant 20, e.g. a SCADA server, a Power Plant Controller, as well as any electrical components (not shown in FIG. 1) necessary in order to perform electrical control of the output of the wind power park (such as switchgear, park transformer, STATCOM). A power plant controller 13 of the substation 12 is arranged for communicating (not shown) with turbine control processors of the individual wind turbines 10 of the wind power plant 20. The means for communication between the power plant controller 13 and the individual wind turbines 10 may be any appropriate wired or wireless means for communication (not shown in FIG. 1).

Figure 2:
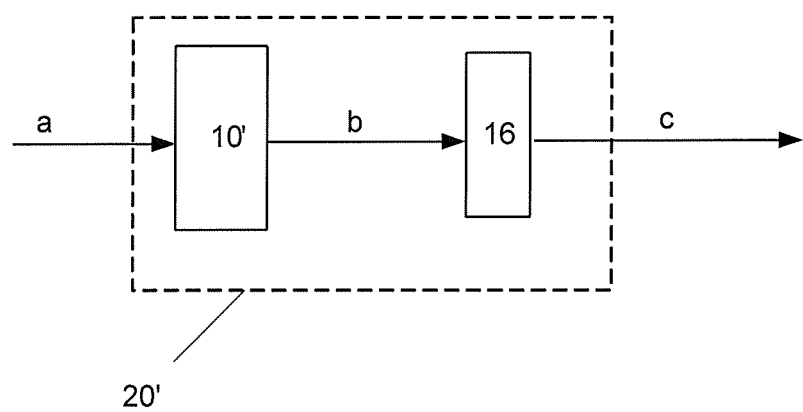
FIG. 2 is a schematic drawing of a prior art aggregation model of the electrical output from a wind power plant.

FIG. 2 is a schematic drawing of a prior art aggregation model of the electrical output from a wind power plant. In FIG. 2, the reference numeral 10' indicates a model of a single wind turbine 10 and the reference numeral 20' indicates a model of a wind power plant 20 comprising a number of wind turbines 10. Input parameter signal "a" comprises input parameters, such as external active and/or reactive power references and/or a power factor reference for the turbine 10 and/or stator voltage and/or stator frequency of the wind turbine 10. The model 10' is arranged for providing a calculation of electrical output of the wind turbine 10, e.g. active and/or reactive output power of the wind turbine 10. The electrical output from the model 10' is denoted "b" in FIG. 2. The reference numeral 16 indicates a multiplication of the output "b" from the model 10' and the number of operating wind turbines 10 in the wind power plant 20 (see FIG. 1). The result of this multiplication is the output "c" from the model 10'. The model 20' is denoted an aggregation model, in that the output "c" from the wind power plant is found as an aggregation of the outputs "b" from a number of individual wind turbines 10.

It is an underlying assumption of the model 10' that the wind turbines 10 within the wind power plant 20 have the same operating conditions, such as the same wind speed, the same mechanical properties of the drive train and/or rotor, the same electrical properties of the generator, and that the wind turbines 10 within the wind power plant 20 react similarly and at the same time on changes occuring in the conditions for operating the wind power plant, such as changes in wind speed or changes in control originating from the power plant controller. The result of the aggregation model 20' can be seen as a worst case scenario in that the aggregation of the power from the wind turbines 10 towards the point of common connection (corresponding to output result "c") does not take any effect of the distribution of operating conditions of the individual wind turbines 10 into account.

Figure 3:
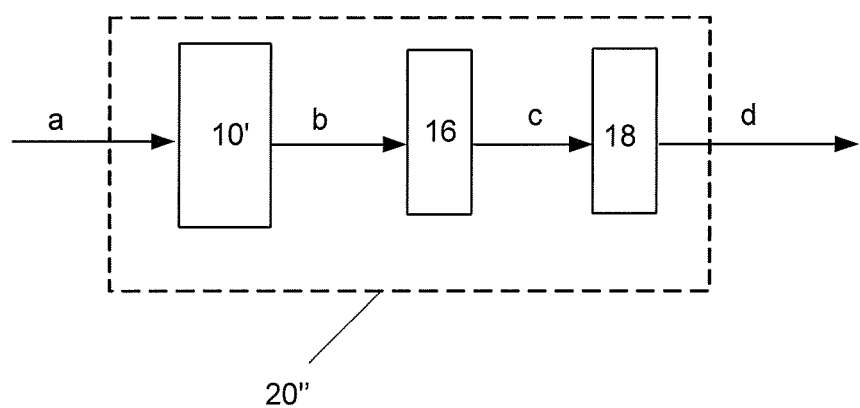
FIG. 3 is a schematic drawing of an aggregation model of the electrical output from a wind power plant according to the invention.

FIG. 3 is a schematic drawing of an aggregation model 20" of the electrical output from a wind power plant according to the invention. Similar reference numerals 10', 16, a, b, c as in FIG. 2 denote similar features as in FIG. 2 and will not be described in further detail here. However, in FIG. 3 the output "c" is not the result of the model 20", but an intermediate result used subsequently in order to provide an optimized result "d". The reference numeral 18 indicates an adjustment of the intermediate result "c". The adjustment 18 comprises a statistical assessment of stochastic variability of one or more of the input parameters "a" between the individual wind turbines 10 of the wind power plant 20, a calculation of the influence of the stochastic variability of said one or more input parameters "a" on the electrical output of the wind power plant 20, and providing an adjustment corresponding to the calculated influence of the stochastically variability of said one or more input parameters on the intermediate result "c".

Those input parameters of the input parameters "a" which may vary stochastically comprise (but are not limited to): wind speed, electrical parameters, such as torsion damping controller parameters relating to the generator component of the individual wind turbines, mechanical parameters, such as eigen-frequencies of drive-trains of individual wind turbines, operation conditions of individual wind turbines in wind power plant, communication times between a power plant controller and individual wind turbines.

Figure 4A:
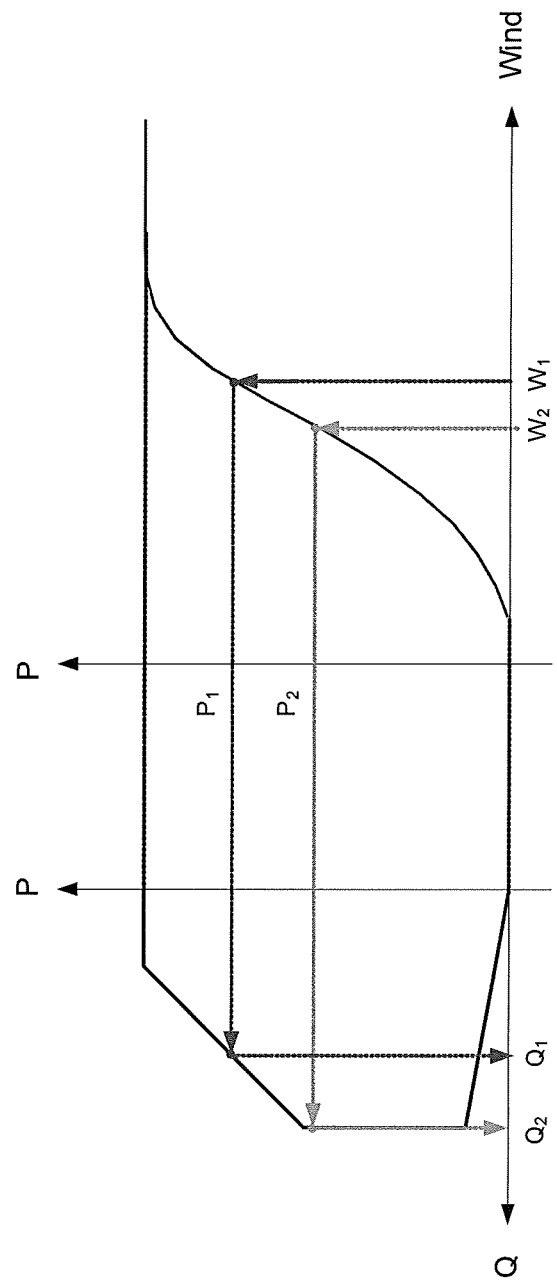
FIG. 4a is a chart disclosing the relation between wind speed and active capability of a wind turbine with a doubly-fed induction generator (DFIG) as well as the relation between active and reactive capability of a wind turbine with a doubly-fed induction generator (DFIG)

FIG. 4a is a chart disclosing the relation between wind speed and active capability P of a wind turbine 10 with a doubly-fed induction generator (DFIG) as well as the relation between active capability P and reactive capability Q of the wind turbine 10 with a doubly-fed induction generator (DFIG). It may be seen that a first wind speed, $W_1$, corresponds to a first active capability $P_1$ and to a first reactive capability $Q_1$ of an individual wind turbine 10 and that a second, lower wind speed $W_2$ corresponds to a second, lower active capability $P_2$ and to a second, higher reactive capability $Q_2$ of the wind turbine 10. Therefore, differences in wind speed between different wind turbines 10 of a wind power plant 20 has an influence on the output capabilities P, Q of the individual wind turbines 10. Since a wind power plant may consist of 20 to 60 or more wind turbines, the spatial displacement of the turbines and the stochastic nature of the wind will render the speed and direction of the wind different for each individual turbine. FIG. 4a clearly shows that the relationship between the wind speed and the available active power capability P is non-linear. Furthermore, it is evident that a non-linear relationship exists between the active power capability P and the reactive power capability Q of the turbine (the PQ-capability chart in the left part of FIG. 4a). Thus, it is necessary to take the variabilty of the wind speed into account if the electrical output of a wind power plant 20 is to be calculated precisely.

Figure 4B:
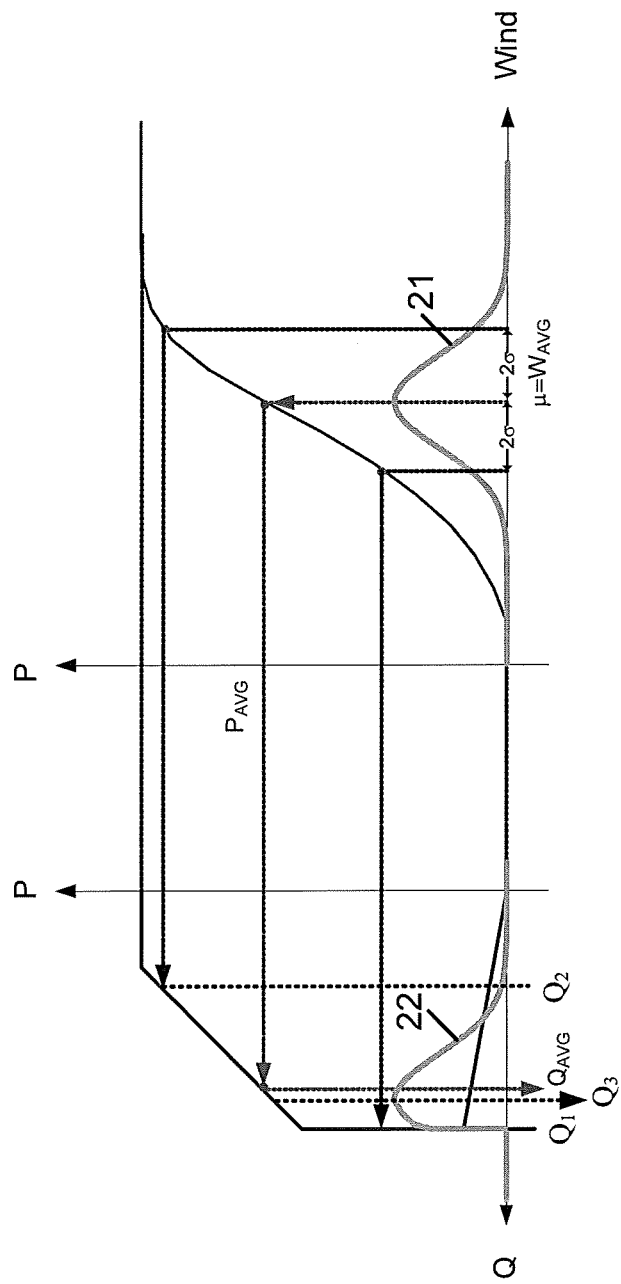
FIG. 4b is a chart disclosing the relation between wind speed and active capability of a wind wind power plant as well as the relation between active and reactive capability of a wind power plant.

FIG. 4b is a chart disclosing the relation between wind speed and the active capability P of a wind wind power plant 20 as well as the relation between active and reactive capability P, Q of a wind power plant 20. In FIG. 4b, the wind speed is represented by a normal distribution (the bell shaped curve 21 in the right-hand chart of FIG. 4b) with an an average value $\mu=W_{AVG}$ and a standard deviation σ. For the aggregated model 20" one specific value for the reactive capability Q of the wind power plant 20 must be selected. A statistical analysis of a given wind power plant configuration can be used to determine the most likely value to use for the reactive capability Q of the aggregated wind power plant 20. To this effect, a curve 22 in the PQ-chart (the left hand chart of FIG. 4b) corresponding to the curve 21 in the Wind-P chart (the right hand chart of FIG. 4b) has been created. Due to the non-linearities between wind and active capability P and between active capability P and reactive capability Q, the shape of the curve 22 differs from the shape of the curve 21.

In FIG. 4b is also indicated the reactive capability $Q_1$ corresponding to a wind speed of the average wind speed $W_{AVG}$ minus two standard deviations, 2 σ, as well as the reactive capability $Q_2$ corresponding to a wind speed of the average wind speed $W_{AVG}$ plus two standard deviations, 2 σ. Moreover, the reactive capability $Q_3$ has been indicated as the most probable value of the reactive capability Q for a probability distribution of the wind speeds corresponding to the curve 21.

It may be noted from FIG. 4b that the reactive capability $Q_{AVG}$ corresponding to the average value of the wind speed differs from the reactive capability $Q_3$ corresponding to the most probable reactive capability, in case the wind speed distribution is as indicated in the curve 21. The difference between the most probable value $Q_3$ of the reactive capability Q and the reactive capability $Q_{AVG}$ corresponding to the average wind speed $W_{AVG}$ is an example of an adjustment of an adjustment to a calculation of the electrical output from a wind power plant compared with a simple aggregation calculation where the output of a wind power plant containing N operating wind turbines is calculated as N times the electrical output from one wind turbine. Thus, it can be seen that such an adjustment of reactive capability makes the determination thereof more precise.

FIGS. 5a-5d relate to the aggregation of the drive train response from a wind power plant. Due to fairly large variation of the mechanical parameters of the drive train of the individual wind turbines in a wind power plant, the frequency and damping of the drive trains within a wind power plant show different behaviour. For a large number of turbines in a wind power plant, this introduces a certain cancellation of the power oscillations from the torsion damping of the individual turbines. FIGS. 5a-5d relate to the differences within a population of 100 wind turbines.

A straightforward solution to calculate the electrical output from a wind power plant would be to scale the response of a single turbine by the number of turbines in the wind farm. This is a very conservative worst-case scenario corresponding to all drive trains being identical and thus oscillating at the exact same phase and amplitude.

Some grid codes do not allow sustained power oscillations after a grid fault or low voltage ride through (LVRT) event for more than 4-5 seconds. Therefore, it would be important that the straightforward aggregated model is adjusted so as to not reflect the worst case behaviour. As it will be explained below in connection with FIGS. 5a-5d, the method of calculation according to the invention taking the variability distribution between individual wind turbines of a wind power plant into account may provide much more precise results than the straightforward aggregation calculation method.

Figure 5A:
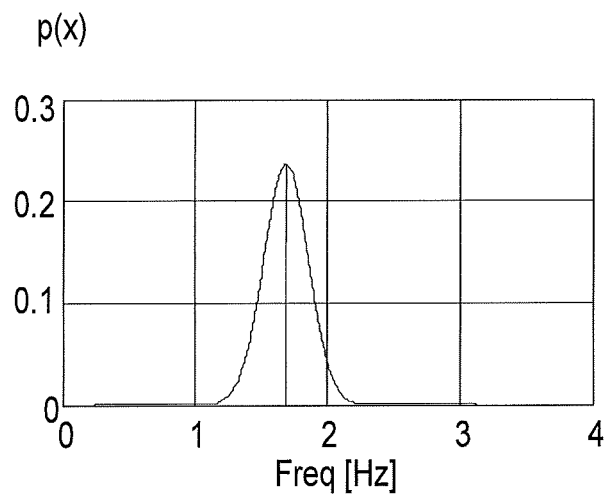
FIG. 5a is a chart showing a probability density function of frequencies of the drive train of an operating wind turbine.
Figure 5B:
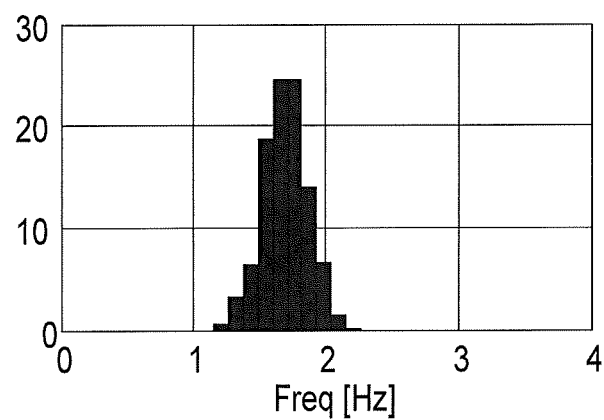
FIG. 5b is a histogram showing an example of a simulated distribution of drive train frequencies among 100 wind turbines.

FIGS. 5a-5f relate to the assumption that the drive train frequencies of the individual wind turbines in a wind power plant with a number of operating wind turbines are normally distributed around the nominal value instead of oscillating with the same phase and eigenfrequency. FIGS. 5a and 5b discloses probability distributions between 100 wind turbines, whilst FIGS. 5c-5f relate to 10 wind turbines only, for the sake of clarity.

FIG. 5a is a chart showing a probability density function of frequencies of the drive train of an operating wind turbine. The probability density function is a normal distribution with mean value $\mu=1.69$ Hz and standard deviation $\delta=0.169$. This means that 95% of all frequencies should be within the nominal frequency ±20%.

FIG. 5b is a histogram showing an example of the simulated distribution of drive train frequencies among the 100 wind turbines of the wind power plant. The histogram of FIG. 5b is an example of a randomly generated distribution of drive train frequencies. It may be seen that almost all wind turbine drive trains have an eigen frequency between 1 and 2 Hz, and that most drive trains have an eigen frequency of about 1.7 Hz.

Figure 5C:
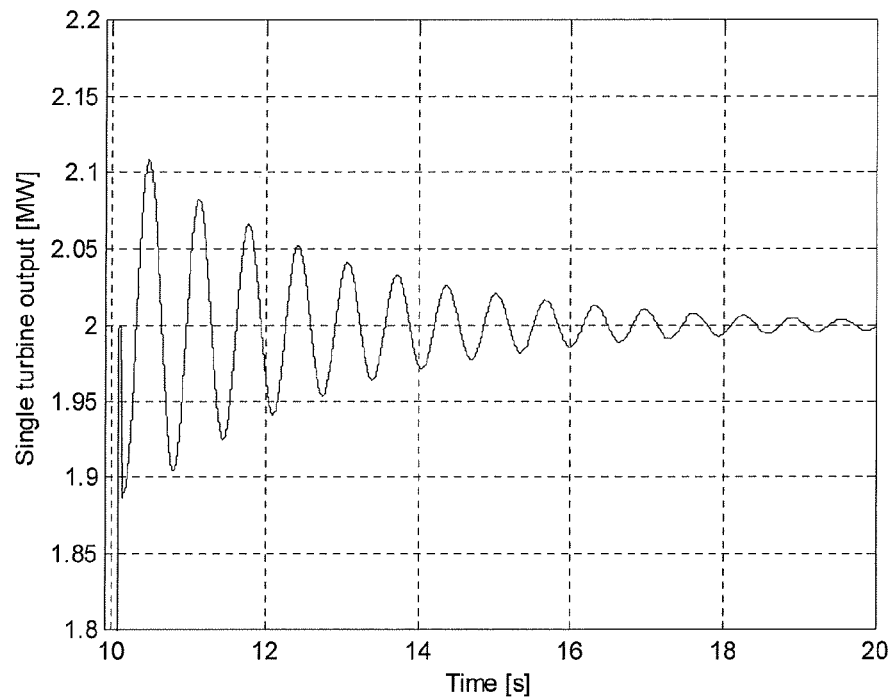
FIG. 5c is a chart disclosing the output from a single wind turbine.

FIG. 5c is a chart disclosing the output from a single wind turbine. The unit of the X axis is the time in seconds and the Y axis shows the electrical power output from the turbine.

When the time has the value 10 seconds, a disturbance arises and the drive train oscillates; this makes the electrical power output from the turbine vary around the value of 2 megawatt (MW). When the time has the value 20 seconds, the amplitude of the variations has decreased substantially.

Figure 5D:
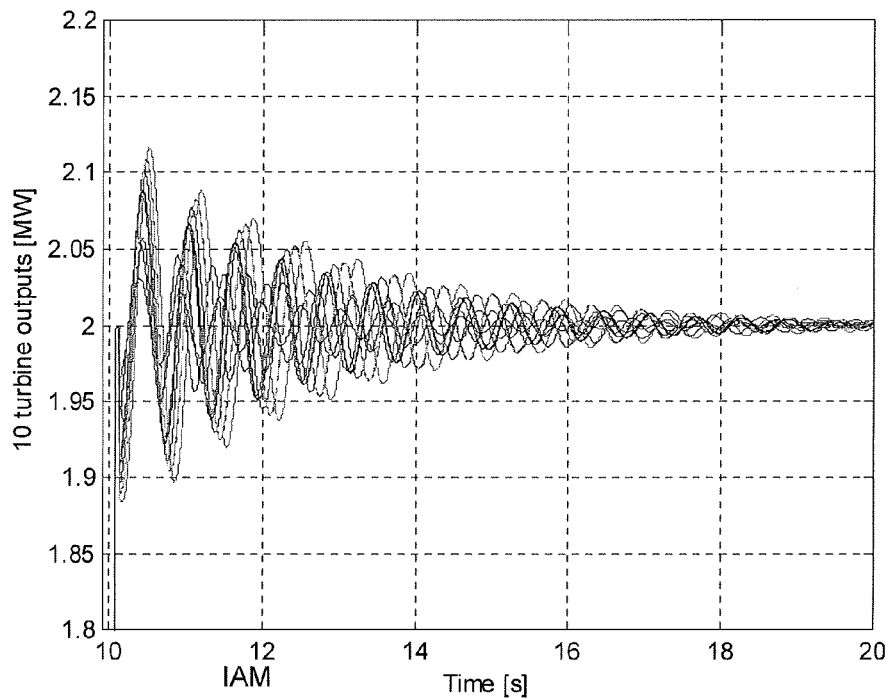
FIG. 5d is a chart disclosing the simulated drive train response from the drive trains of 10 wind turbines.

FIG. 5d is a chart disclosing the simulated drive train response from the drive trains of 10 wind turbines. The unit of the X axis is seconds and the unit of the Y axis is again the electrical output from each of the turbines, measured in megawatt (MW). The chart includes graphs of several different eigenfrequencies of the drive trains of the different wind turbines. It may be seen that most drive trains have similar influence on the output of active power in the first period of oscillation, corresponding to a time span on the order of one second, and that after that the graphs appear increasingly blurred, due to the influence of a difference between the eigenfrequencies of the drive trains of the individual wind turbines.

Figure 5E:
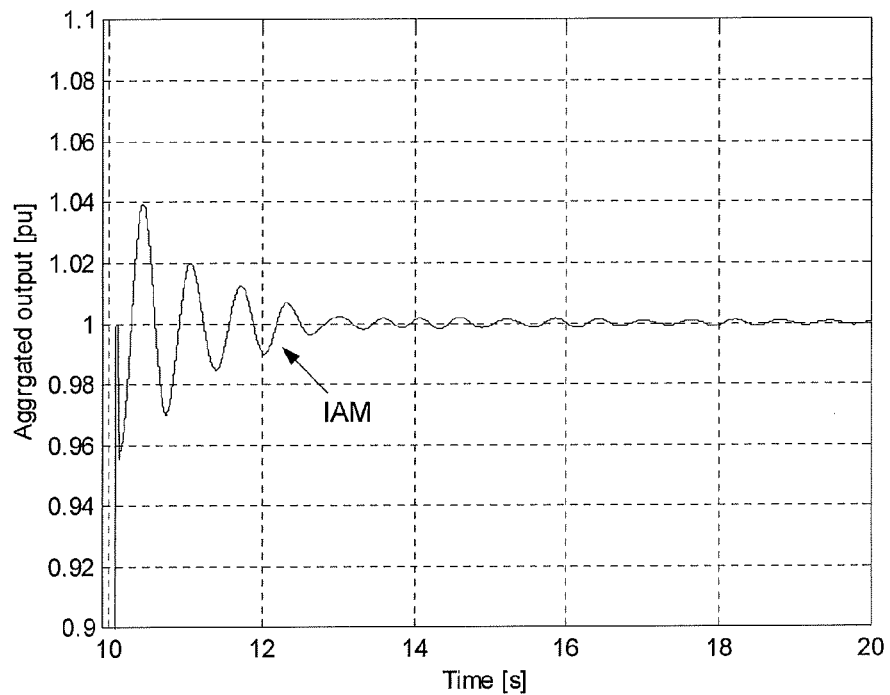
FIG. 5e is a chart disclosing the aggregated output from 10 wind turbines calculated according to a method of the invention.

FIG. 5e is a chart disclosing the aggregated output from 10 wind turbines calculated according to a method of the invention. In FIG. 5e, the Y axis does not have any unit, but represents active power normalized with respect to the nominal power of the wind power plant (1 pu) with 10 wind turbines. It may be seen from FIG. 5e, that the oscillations of the drive train of an aggregated wind turbine, where the calculated influence of the stochastically variability of the drive train eigenfrequency has been taken into account, are reduced to a quite low level after an order of time of 2-3 seconds.

Figure 5F:
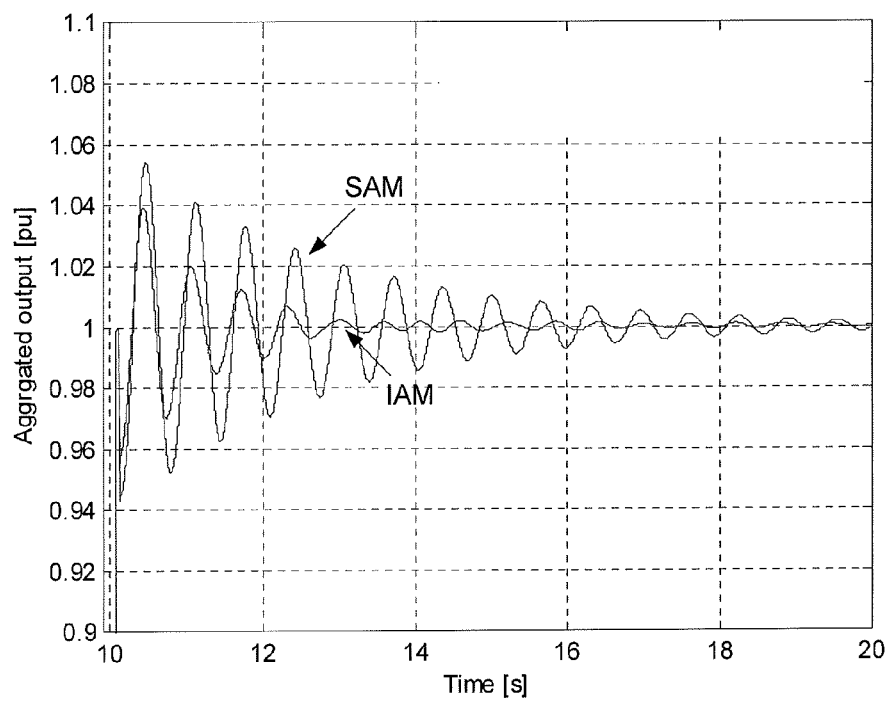
FIG. 5f is a chart disclosing the calculated responses of the drive trains of 10 wind turbines according to a prior art as well as according to the invention.

FIG. 5f is a chart disclosing the aggregated calculated response of the drive trains of 10 wind turbines according to a prior art as well as according to the invention. The unit of the X axis is seconds and), again the Y-axis does not have a unit but represents the power contribution from the drive train damping only, in that the Y-axis represents active power normalized with respect to the nominal power of the wind power plant (1 pu). The chart shows the curve "SAM" corresponding to a simple aggregating model wherein the output from a wind power plant of a number of wind turbines is calculated as the output from a single wind turbine multiplied by the number of wind turbines (e.g. 10). The curve SAM thus corresponds to the curve in FIG. 5c multiplied by the number of wind turbine and normalized to the nominal power of the wind power plant.

The chart moreover shows the curve "IAM" corresponding to the inventive aggregation model, wherein the stochastic variability of drive train parameters and operating conditions are taken into account. The curve "IAM" of FIG. 5f is identical to the curve "IAM" depicted in FIG. 5e.

It may be seen from the chart that within the first period of drive train oscillation, the curves SAM and IAM are quite close; however, after the first period, the amplitude of the curve IAM is smaller than that of the curve SAM. Moreover, the IAM curve shows that the oscillations of the drive train as calculated by the method according to the invention are reduced substantially after a few seconds, and that after 2.5 seconds the oscillation has been dampened to zero. This should be compared with the curve SAM, the amplitude of which is only dampened to zero after about 4 seconds. Thus, the method of calculation according to the invention provides a result different from the worst case result of the simple aggregation model. Thus, when the stochastically variability of the variable "eigenfrequency" has been taken into account, large cancellation effects take place.

The larger the variation of drive train frequencies, the faster the cancellation is achieved.

Due to the damping of the system, the amplitude of the oscillation is decreasing exponentially. Large drive train frequency variations between individual wind turbines, that is in the order of 15-20% will have significant impact on the aggregated model's response according to the invention. Even small variations in drive train frequency variations will show a cancellation effect, however it might be relatively slow. The faster the damping takes place, the larger variations are needed in order to obtain the cancellation. A system with a low damping controller gain will have a poor damping, meaning that the power oscillations will be attenuated only slowly, that is over many periods, and in such a case even a very small diversity will eventually lead to a cancellation effect.

Figure 6:
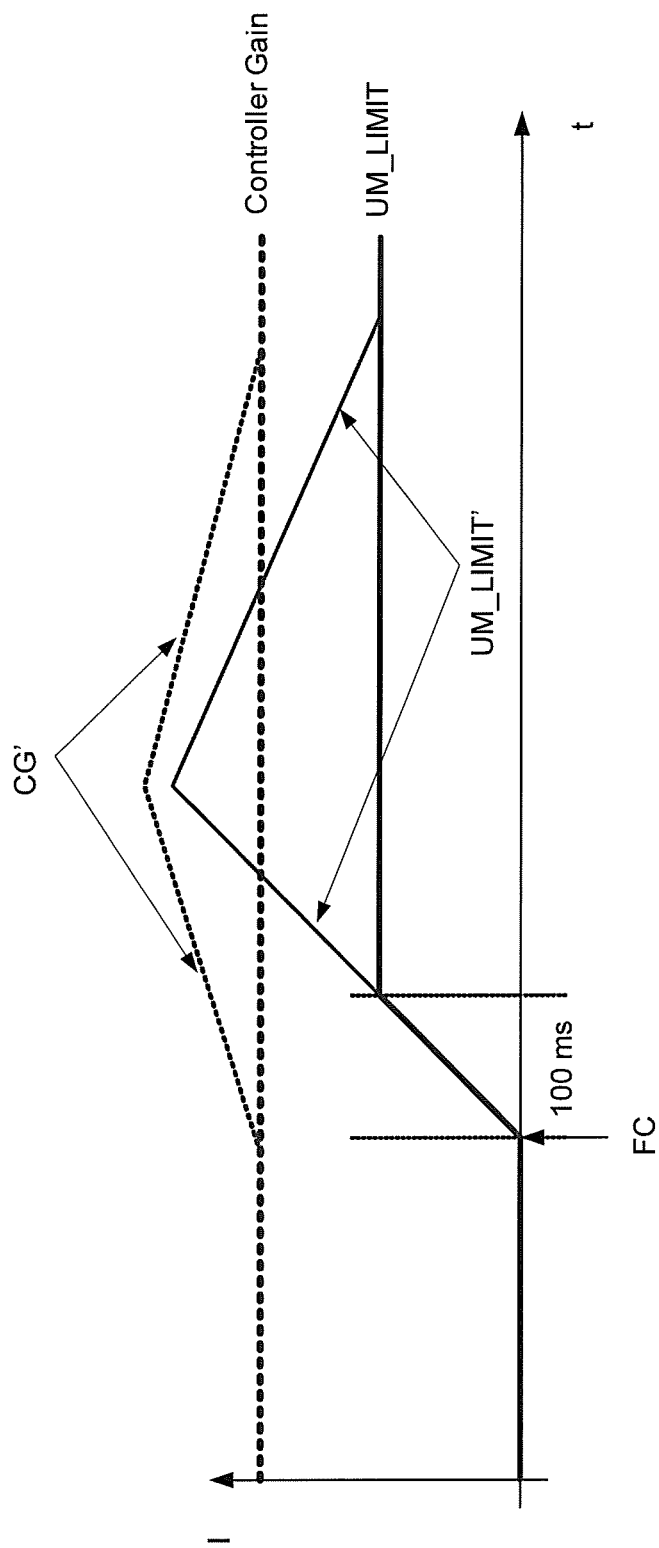
FIG. 6 is a diagram showing the gain and limit variation of a torsion damping controller for a prior art calculation as well as a calculation according to the invention.

FIG. 6 is a diagram showing the gain and limit variation of a torsion damping controller for a prior art calculation as well as a calculation according to the invention. The torsion damping controller of a wind turbine is a controller arranged to control the generator of the wind turbine so as to dampen mechanical oscillations of the drive train. FIG. 6 discloses calculations of the proposed gain ("controller gain" and limit (UM_LIMIT) variations of the torsion damping controller for an aggregated calculation of a wind power plant. FIG. 6 shows calculations of simple aggregation methods, wherein the output from the wind power plant is calculated as the output from a single wind turbine multiplied by the number of wind turbines, as well as the results of the aggregation method according to the invention, where the variability of the drive trains of the individual wind turbines is taken into account. The calculated output from this aggregation method according to the invention corresponds to the calculated output from the simple aggregation model at some instances in time, but deviates from it in the parts of the graphs indicated as CG' and UM_LIMIT'.

The X axis of the diagram represents the time axis. For the curve UM_LIMIT and the adjusted corresponding curve UM_LIMIT', the Y axis represents the current I. The parameter UM_LIMIT is the current limit of the drive train damper and the controller gain determines how many Ampere should be injected per deviation of mechanical speed in revolutions per minute (RPM). If gain is increased without increasing the current limit, it will have no effect as the current will stay in the limit all the time. The gain increase is in order to obtain a faster damping of the oscillation as to emulate the cancellation effect.

The upper curve of FIG. 6 represents the controller gain. This gain is between drive train speed changes and current injection.

Even though FIG. 6 relates to drive train damping where mechanical speed variations lead to a current injection by altering the current reference of the generator controller, it should be noted that it is also conceivable to improve the drive train damping by altering the power.

It may be seen that at the instant of a fault clearance (indicated by FC in FIG. 6) and at some time afterwards, the controller gain of the simple aggregation model deviates from that calculated by the aggregation model of the invention (see CG').

The lower curve of FIG. 6 represents the torsion damping controller limits. After a fault clearance, the torsion damping controller limits rise. At 100 ms from the fault clearance, the torsion damping controller limits as calculated by the simple aggregation method remains constant; however, FIG. 6 shows that the torsion damping controller limits as calculated by the method of the invention increases to a substantially higher level compared to that of the simple aggregation method (see the curve UM_LIMIT'). After some time, the torsion damping controller limits UM_LIMIT' as calculated by the method of the invention starts decreasing and converges to the torsion damping controller limits as calculated by the simple aggregation method. Again, it is clear that the influence of variability, which is taken into account in the aggregation method of the invention, renders different, enhanced results compared to the simple aggregation method.

The parameter UM_LIMIT is the current limit of the drive train damper and the controller gain determines how many Amperes should be injected per RPM mechanical speed deviation. If gain is increased without increasing the current limit, it would not have any effect in that the current would stay in the limit all the time. The gain increase renders it possible to to obtain a faster damping of the oscillation in order to emulate the cancellation effect due to variations in drive train oscillations.

Figure 7:
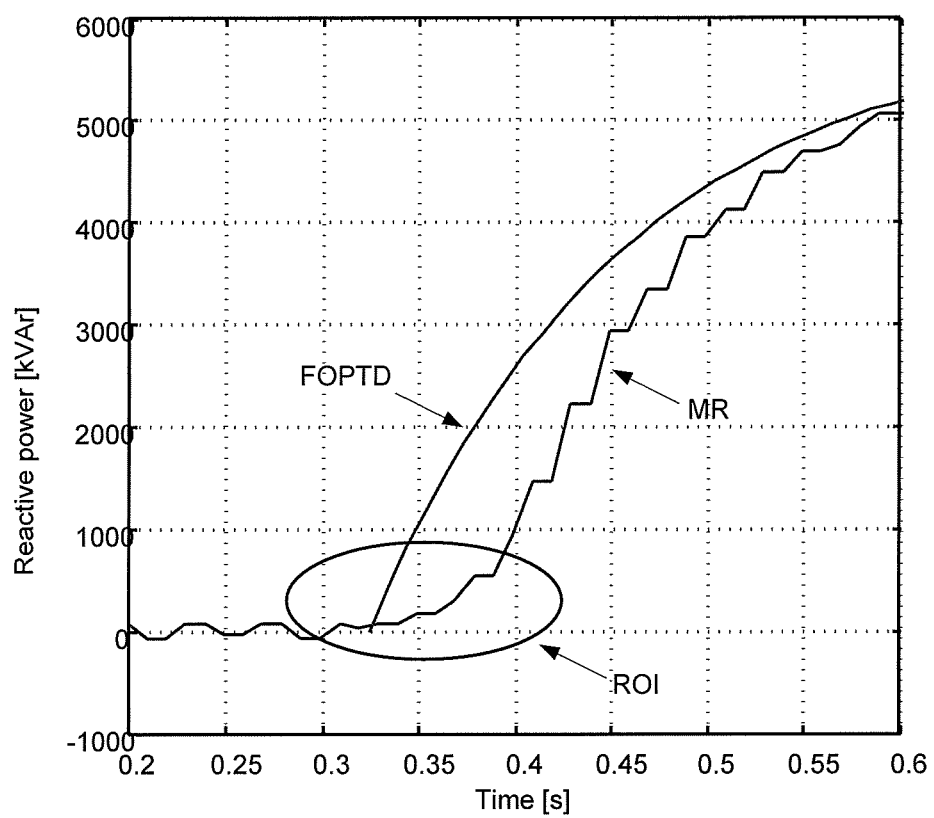
FIG. 7 is a chart of measured response time as well as an estimate of response time from a wind power plant to communications sent from a power plant controller to the individual wind turbines of the wind power plant.
Figure 8:
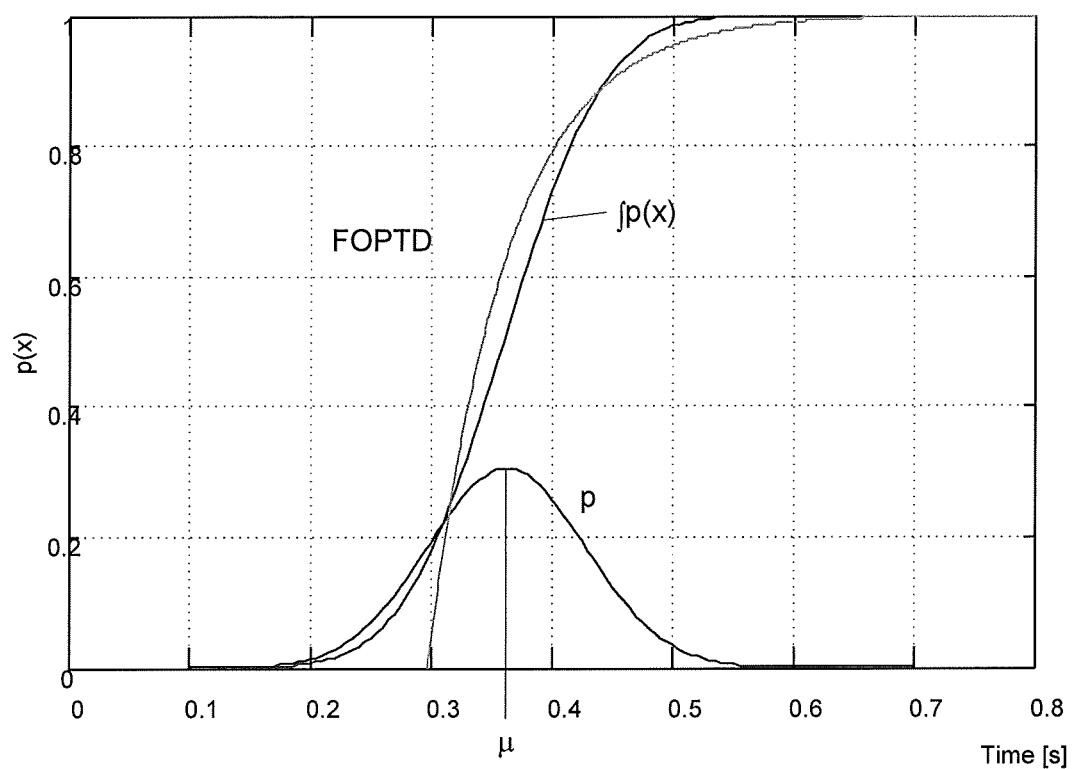
FIG. 8 is a chart of probability density function shown together with the FOPTD curve of FIG. 7.
Figure 9:
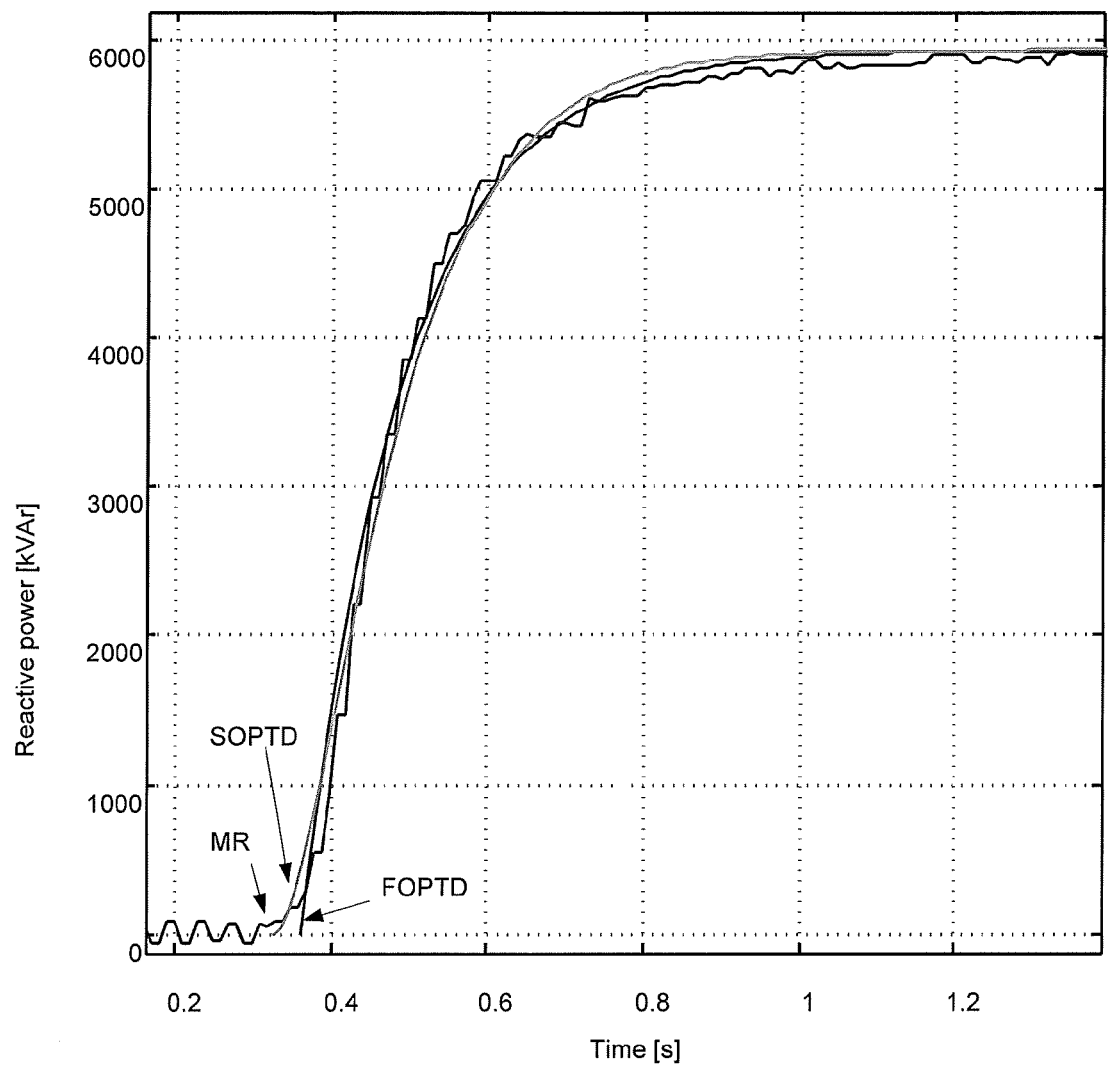
FIG. 9 is a chart of measured response time as well as two estimates of response time from a wind power plant to communications sent from a power plant controller to the individual wind turbines of the wind power plant.

FIGS. 7 to 9 relate to response times of a wind power plant to communications sent from a power plant controller to individual wind turbines of the wind power park.

FIG. 7 is a chart of measured response time as well as an estimate of response time from a wind power plant to communications sent from a power plant controller to the individual wind turbines of the wind power plant. The X-axis represents the time measured from the instant in time of an issuance of control command to increase reactive power sent from the wind power plant controller to the individual wind turbines of the wind power plant, and the Y-axis represents the reactive power Q of the wind power plant. Two curves are shown in FIG. 7: the one denoted FOPTD (First Order Plus Time Delay) is a calculated estimate of the reactive power from the wind power plant of a simple aggregation calculation, where the output of a wind power plant is calculated as the output of a single wind turbine multiplied by the number of wind turbines in the wind power plant. The curve denoted MR is the measured response of the wind power plant. The encircled region ROI shows that a difference of the onsets of reaction from the wind power plant exists between the simple calcuation FOPTD and the measured response. Thus, at the times between 0.3 seconds and 0.6 seconds, a difference exists between the measured response and the simple aggregation model.

FIG. 8 is a chart of probability density function "p" shown together with the FOPTD curve of FIG. 7 and an accumulated probability function "∫p(x)". The probability function p is a representation for the time lapsing from the issuance of a control command sent from the wind power plant controller to the individual wind turbines to the time of receipt thereof at the individual wind turbines. It is assumed that the probability function is a normal distribution with an an average value $\mu$ and a standard deviation $\sigma$. It may be seen that the accumulated probability function ∫p(x) and the FOPTD curve have comparable onsets times and reactions. It may be noted that in order to model the entire wind power plant so that the calculation shows that some wind turbines start responding before the average delay time $\mu$, the time delay for the entire wind power plant is smaller than $\mu$.

FIG. 9 is a chart of measured response time MR as well as two estimates FOPTD, SOPTD of response time from a wind power plant to communications sent from a power plant controller to the individual wind turbines of the wind power plant. The estimate FOPTD is similar to the FOPTD curve shown in FIGS. 7 and 8 and corresponds to a simple aggregation calculation, where the output of a wind power plant is calculated as the output of a single wind turbine multiplied by the number of wind turbines in the wind power plant. The "second order plus time delay" curve (SOPTD curve) corresponds to the FOPTD curve adjusted by assumption that the time delay between the wind turbines follow the probability densition function p of FIG. 8. From FIG. 9 it may be seen that the SOPTD curve shows a better similarity with the measured response curve MR than the FOPTD curve; this better similarity is especially clear at the onset of the response of the wind power plant at about 0.3-0.35 seconds. Thus, when the calculation of the electrical output from a wind power plant takes a variability in the communication times between the power plant controller and the individual wind turbines in the wind power plant into account, the calculation provides a better correspondance between the measured and the calculated output from the wind power plant compared to a simple aggregation model.

The FIGS. 4a-9 show the influence on an aggregated model of stochastic varying parameters individually, viz. diversity in wind speed and direction across the entire wind power plant, variability in drive train responses and communication delays between wind turbines in the wind power plant. Is should be understood that these figures each relates to one of these differences, and that more than one of such differences typically influence the wind power plant simultaneously. Preferably, all such stochastically varying parameters should be taken into account in the calculation of the electrical output of the wind power plant.

Figure 10:
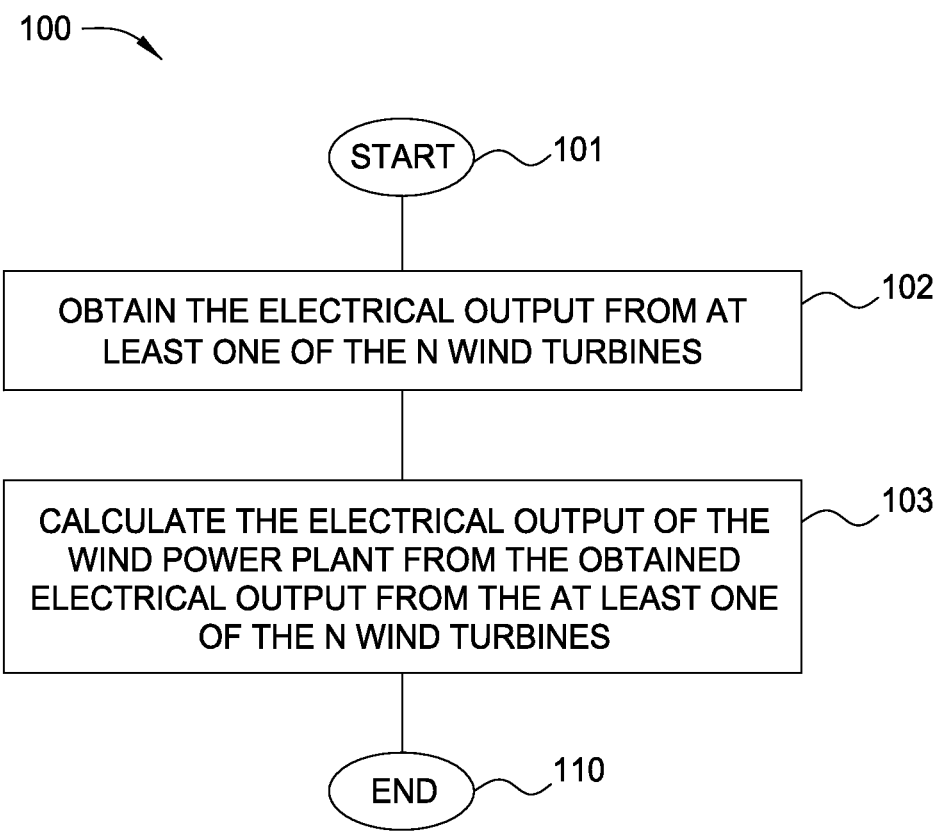
FIG. 10 is a flow-chart of a method according to the invention.

FIG. 10 is a flow-chart of a method 100 according to the invention. The method 100 is a method of calculating an electrical output of a wind power plant comprising N wind turbines. The method starts in step 101 and continues to step 102, where the electrical output from at least one of the N wind turbines is obtained. It is assumed that the N wind turbines are similar; alternatively, the electrical output from each different wind turbine amongst the N wind turbines should be obtained. The electrical output may be a power curve of the wind turbine, the active capability of the wind turbine, and the reactive capability of a wind turbine.

In the subsequent step, step 103, the electrical output of the wind power plant is calculated from the obtained electrical output data from the at least one of said wind turbines and from the number N of wind turbines. Such a calculation may e.g. comprise the following sub-steps (not shown in FIG. 10):

performing a statistical assessment of stochastic variability of one or more input parameters between the individual wind turbines of said first number of wind turbines;

calculating the influence of the stochastic variability of said one or more input parameters on the electrical output of the wind power plant, and providing the calculation as an aggregation of the individual wind turbines adjusted by said calculated influence of the stochastically variability of said one or more input parameters.

The term "aggregation of the individual wind turbines" is meant to denote that the output of a single wind turbine is multiplied by the number of wind turbines in order to obtain the aggregation. If M wind turbines of model m exist, an n wind turbines of model n exists, an aggregation of a wind power plant comprising M wind turbines of model m and N wind turbines of model n consists in multiplying the output of a wind turbine of model m by M and adding the output of a wind turbine of model n by N.

The model ends in step 110.

The invention can be implemented in any suitable form including hardware, software, firmware or any combination of these. The invention or some features of the invention can be implemented as computer software running on one or more data processors and/or digital signal processors.

In short, the invention relates to a method of calculating an electrical output of a wind power plant comprising a of wind turbines. Instead of calculating the electrical output of the wind power plant as a simple aggregation of the outputs of each wind turbine, the method takes into account parameters which may vary stochastically throughout the wind power plant, e.g. pitch angle, stiffness in drive train, different possible production with regard to reactive and active effect, mechanical component properties as well as variability in relation to communication times between a power plant controller and the individual wind turbines. The method proposes to make adjustment to a simple aggregation calculation method based on analysis of such stochastic varying parameters.

Although the present invention has been described in connection with the specified embodiments, it is not intended to be limited to the specific form set forth herein. Rather, the scope of the present invention is limited only by the accompanying claims. In the claims, the term "comprising" does not exclude the presence of other elements or steps. Additionally, although individual features may be included in different claims, these may possibly be advantageously combined, and the inclusion in different claims does not imply that a combination of features is not feasible and/or advantageous. In addition, singular references do not exclude a plurality. Thus, references to "a", "an", "first", "second" etc. do not preclude a plurality. Furthermore, reference signs in the claims shall not be construed as limiting the scope.

The invention claimed is:

1. A method of controlling operation of a wind power plant comprising a first number (N) of wind turbines coupled with a power plant controller and producing an electrical output, the method comprising:
   determining an aggregated electrical output of the wind power plant based on a determined electrical output of at least one, and less than N, of the N wind turbines;
   determining a stochastic variability between the individual wind turbines of the N wind turbines by performing a statistical assessment of one or more input parameters selected from the group consisting of electrical parameters, mechanical parameters, operating conditions, and communication times with the power plant controller;
   adjusting, based on the determined stochastic variability, the aggregated electrical output to determine the electrical output of the wind power plant; and
   communicating, with the power plant controller, control signals to the N wind turbines based on the determined electrical output of the wind power plant.

2. The method of claim 1, wherein the determined electrical output is provided as one or more of a power curve of the wind power plant, an active capability of the wind power plant, and a reactive capability of the wind power plant.

3. The method of claim 2, wherein the determined electrical output comprises the active and reactive production capabilities of the wind power plant.

4. The method of claim 1, wherein the electrical parameters comprise torsion damping controller parameters relating to generator components of the individual wind turbines.

5. The method of claim 4, wherein adjusting the aggregated electrical output based on the assessed stochastic variability allows increased current limits for torsion damping controllers of the individual wind turbines, relative to current limits corresponding to the aggregated electrical output.

6. The method of claim 5, wherein the increased current limits allow the torsion damping controllers to operate with increased gain values.

7. The method of claim 6, wherein operating the torsion damping controllers with increased gain values corresponds to a relatively faster damping of mechanical oscillations of drive trains of the individual wind turbines.

8. The method of claim 1, wherein the communication times comprise time delays for communication between the wind power plant controller and the individual wind turbines.

9. The method of claim 8, wherein the time delays for communication represent amounts of time between the power plant controller issuing a control command, and receipt of the control command at the individual wind turbines.

10. The method of claim 1, wherein the determined electrical output is represented as an equivalent of a second number (M) of wind turbines, where M is substantially smaller than N.

11. The method of claim 1, wherein the mechanical parameters comprise eigenfrequencies of drive trains of the individual wind turbines.

12. The method of claim 1, wherein determining the aggregated electrical output of the wind power plant includes multiplying the determined electrical output by N.

13. A computer program product, comprising:
   a non-transitory computer readable medium including program instructions for controlling operation of a wind power plant comprising a first number (N) of wind turbines coupled with a power plant controller and producing an electrical output, the operation comprising:
      determining an aggregated electrical output of the wind power plant based on a determined electrical output of at least one, and less than N, of the N wind turbines;
      determining a stochastic variability between the individual wind turbines of the N wind turbines by performing a statistical assessment of one or more input parameters selected from the group consisting of electrical parameters, mechanical parameters, operating conditions, and communication times with the power plant controller;
      adjusting, based on the determined stochastic variability, the aggregated electrical output to determine the electrical output of the wind power plant; and
      communicating, with the power plant controller, control signals to the N wind turbines based on the determined electrical output of the wind power plant.

14. The computer program product of claim 13, wherein the determined electrical output is provided as one or more of a power curve of the wind power plant, an active capability of the wind power plant, and a reactive capability of the wind power plant.

15. The computer program product of claim 14, wherein the determined electrical output comprises the active and reactive production capabilities of the wind power plant.

16. The computer program product of claim 13, wherein the determined electrical output is represented as an equivalent of a second number (M) of wind turbines, where M is substantially smaller than N.

17. The computer program product of claim 13, wherein the mechanical parameters comprise eigenfrequencies of drive trains of the individual wind turbines.

18. The computer program product of claim 13, wherein the electrical parameters comprise torsion damping controller parameters relating to generator components of the individual wind turbines.

19. The computer program product of claim 13, wherein the communication times comprise time delays for communication between the wind power plant controller and the individual wind turbines.

20. A wind power plant, comprising:
   a first number (N) of wind turbines; and
   a control arrangement including a power plant controller coupled with the N wind turbines, wherein the control arrangement is configured to:

determine an aggregated electrical output of the wind power plant based on a determined electrical output produced by at least one, and less than N, of the N wind turbines;

determine a stochastic variability between the individual wind turbines of the N wind turbines by performing a statistical assessment of one or more input parameters selected from the group consisting of electrical parameters, mechanical parameters, operating conditions, and communication times with the power plant controller;

adjust, based on the determined stochastic variability, the aggregated electrical output to determine the electrical output of the wind power plant; and communicating, with the power plant controller, control signals to the N wind turbines based on the determined electrical output of the wind power plant.

* * * * *